US010131065B2

(12) United States Patent
Franzius

(10) Patent No.: US 10,131,065 B2
(45) Date of Patent: Nov. 20, 2018

(54) SYSTEM AND METHOD FOR ASSISTING REDUCTIVE SHAPING OF AN OBJECT INTO A DESIRED 3D-SHAPE BY REMOVING MATERIAL

(71) Applicant: HONDA RESEARCH INSTITUTE EUROPE GMBH, Offenbach/Main (DE)

(72) Inventor: Mathias Franzius, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 276 days.

(21) Appl. No.: 15/132,451

(22) Filed: Apr. 19, 2016

(65) Prior Publication Data
US 2016/0311124 A1 Oct. 27, 2016

(30) Foreign Application Priority Data
Apr. 23, 2015 (EP) .................................... 15164781

(51) Int. Cl.
*B26B 29/06* (2006.01)
*G05B 19/18* (2006.01)
*A01G 3/04* (2006.01)

(52) U.S. Cl.
CPC ............ *B26B 29/06* (2013.01); *A01G 3/0435* (2013.01); *G05B 19/182* (2013.01); *G05B 2219/35318* (2013.01); *G05B 2219/37095* (2013.01)

(58) Field of Classification Search
None
See application file for complete search history.

(56) References Cited

U.S. PATENT DOCUMENTS

| 4,754,552 | A | | 7/1988 | Warren | |
|---|---|---|---|---|---|
| 5,002,440 | A | * | 3/1991 | Tamaoki | .................. B23G 3/02 408/12 |
| 2009/0088047 | A1 | * | 4/2009 | Zurbuchen | .............. B24B 49/12 451/6 |
| 2010/0006684 | A1 | * | 1/2010 | Burton | .................. B02C 18/144 241/239 |

(Continued)

FOREIGN PATENT DOCUMENTS

| DE | 10 2007 060 245 A1 | 6/2009 |
|---|---|---|
| WO | WO 2013/096572 A1 | 6/2013 |
| WO | WO 2013/163999 A1 | 11/2013 |

OTHER PUBLICATIONS

European Search Report dated Nov. 12, 2015 corresponding to European Patent Application No. 15164781.5.

*Primary Examiner* — Tuan C Dao
(74) *Attorney, Agent, or Firm* — Squire Patton Boggs (US) LLP

(57) ABSTRACT

The invention regards a system and method for assisting reductive shaping of an object into a desired 3D-shape by removing material. The system comprises a tool and a localization means. The tool is configured to remove material from an object by means of a cutting function or a grinding function performed by a working head of the tool. The localization means determines a position of the working head relative to the desired 3D-shape. Each time the grinding function or cutting function would remove material from an inside of the desired 3D-shape the cutting or grinding function is deactivated.

20 Claims, 3 Drawing Sheets

(56) References Cited

U.S. PATENT DOCUMENTS

| | | | | |
|---|---|---|---|---|
| 2011/0067543 | A1* | 3/2011 | Ames | A01D 34/006 83/520 |
| 2014/0345243 | A1* | 11/2014 | Dorigoni | A01G 3/0426 56/234 |
| 2015/0014004 | A1* | 1/2015 | Schubert | B23Q 17/2233 173/1 |
| 2015/0034608 | A1* | 2/2015 | Mori | B23K 11/115 219/86.1 |

* cited by examiner

SYSTEM AND METHOD FOR ASSISTING REDUCTIVE SHAPING OF AN OBJECT INTO A DESIRED 3D-SHAPE BY REMOVING MATERIAL

BACKGROUND

Field

The invention relates to three dimensional shaping of objects by removing material from the object until a desired 3D-shape is achieved.

Detailed Description of the Related Art

Removal of material in order to bring an object into a desired 3D-shape is often used to achieve a particular lock of plants in a garden. In particular, in gardening, hedge cutting is necessary or shrubbery trimming or even topiary when a more sophisticated and artificial lock of plans shall be achieved. But removing material in order to generate a 3D-shape of an object of course is not limited to gardening as mentioned above, but could also be applied to clay modeling or wood carving. The problem when such 3D-shapes shall be realized starting from an object having an arbitrary shape is that either fully automated cutting, grinding or machining is necessary or an operator of a tool needs to handle the tool during removal of the material until the final shape of the object is achieved. Fully automated systems are of course very costly and in case of bigger objects it might be difficult to find such an automated system that is capable of handling such large objects. On the other side in case that a human being handles the tool for cutting, grinding and so on it is the problem that it requires years of training if a 3D-shape shall be cut as free form reliably. Coming to gardening, it is well-known that the gardener uses indicators so that he works along an orientation. This can be done easily in case of simple structures like for example cutting a hedge in box shape. For more complex shapes like for example a cone often used when buxum trees shall be shaped or even more complex shapes like animals it is known to use wire mesh skeletons where the wire mesh describes the surface of the 3D-shape. But of course, the use of such models is limited and in particular no adaptation of the size of the model is possible.

It is thus an object of the present invention to find a system and a method that assists the shaping of an object into a desired 3D-shape. The problem is solved by the system and the method according to the independent claims.

SUMMARY

According to the invention, the system for assisting reductive shaping comprises a tool that is configured to remove material from the object. In order to perform removal of material, the tool has a cutting function or a grinding function or any other function capable of removing material from an object or material block. The system additionally has a localization means. The localization means is configured to determine a position of the working head which performs the cutting function or grinding function relative to the desired 3D-shape. Finally, the system comprises a control means that is configured to deactivate the cutting or grinding function any time the tool is moved into a position such that the cutting function or grinding function would perform removal of material inside the desired 3D-shape.

Thus, with the present invention, it is at first determined the position of a tool's working head relative to a desired 3D-shape and then during a movement of the tool the current position of the working head of the tool is compared to a 3D-shape. Every time the tool is moved such that a removal of material inside the desired 3D-shape would occur, the cutting function or grinding function is stopped by deactivation. Thus, the movement or the handling of the tool does not necessarily lead to cutting the object or removing material from the object and may be imprecise. Thus, an error in handling does not lead to a violation of the surface of the final end shaped object.

It could be realized that in case the tool is then moved backwards so that the working head lies outside the desired 3D-shape, the cutting function or grinding function is activated again automatically. But for safety reasons it could also be considered that the cutting function or grinding function can only be activated by starting it intentionally again by an operator of the tool. The operator can either be a supervisor in case of an automated handling system or in case that the tool is handled and guided manually by for example a gardener, the gardener himself.

The sub claims define advantageous embodiments and features of the present invention. In particular, the invention is advantageous if the tool is a handheld tool. As described above, it is very difficult for a gardener to make a free form shape and thus any imprecise movement of the tool may lead to an awkward surface of the shaped object. Thus, in particular during the period of learning how to generate free form 3D-shapes, it is avoided that an error of the gardener leads to destroying the entire 3D-shape.

It is in particular useful if the working head of the tool consists of a plurality of working head sections that can be activated and deactivated separately. This is in particular advantageous since it might be the case that some of the plurality of working head sections already lies within the 3D-shape while the others are perfectly guided along the surface of the desired 3D-shape. In that case, the perfectly guided parts of the tool still can remove material in order to approach the desired 3D-shape while the further working head sections cannot destroy the shape by unintended cutting of parts lying inside the 3D-shape.

According to another aspect of the invention, it is advantageous if an indication is given that for example guides a gardener with respect to the direction to which he should preferably move the tool in order to provide efficient cutting. Such an indication could be for example given by a plurality of signaling lights each standing for a predetermined movement direction. Thus, in particular an inexperienced gardener may learn three-form shaping more quickly by being assisted with the present inventive system.

Furthermore, it is advantageous if the localization means comprises a camera unit and a processing unit. The camera unit captures images that are provided to the processing unit and the processing unit is configured to perform image processing of images captured by the camera unit. Such systems are easily available on the market, because an integration of a camera unit and a processor is realized by a smart phone, a tablet or the like. Thus, such devices can be used as localization means in case that they are provided with a respective application.

In order to achieve efficient working conditions, it is desirable that the tool and the localization means communicate with each other wirelessly. In particular, wireless communication standards like Bluetooth or WiFi could be used. Using wireless communication has the advantage that no cables for transmitting information from the tool to the localization means or vice versa are used and thus, the safety of the operator is increased.

Additionally or alternatively, it is advantageous if the localization means is configured to obtain three dimensional information of at least the object before and/or during operation. Even before the shaping has started, it is advantageous if the localization means can obtain information on the 3D-shape of the initial object.

Having information about 3D-shape of the initial object as well as the selected or even available 3D-shapes that the object finally shall have, a comparison between the desired or to be selected three dimensional shape and the initial shape of the object can be performed. Thus, an evaluation can be made which of the available 3D-shapes fits the actual 3D-shape of the initial and unworked object best. In case that the desired 3D-shape is already selected without taking into consideration the initial shape of the object it is also possible that the orientation and position for the desired 3D-shape that matches best is determined.

During the process of shaping the object there will be situations where the tool is out of sight for the localization means in case of the single camera. In order to avoid that working on the object has to be interrupted every now and then it is thus advantageous to have at least a second localization unit which forms together with the other localization unit the localization means. It is then of course necessary to arrange the at least two localization units of the localization means in such a way that they cover any position of the tool that needs to be localized during cutting or grinding the 3D-shape of the object. Of course even more than two localization units could be combined to form the localization means.

If the plurality of the localization units is to be used together as a localization means they are configured to calibrate the coordinate system. This means that the 3D-shape which represents the desired final shape of the object is defined in a single coordinate system common to all the localization units.

According to another preferred embodiment which has the advantage that less hardware is necessary only a single localization unit is used as localization means. In that case the localization unit is moved from one position to another in order to avoid that there are areas where the tool cannot be localized during operation. The localization means in that case is configured to determine its position in a consistent coordinate system after being moved from one position to another.

In order to make it easy to recognize the position of the tool it is furthermore preferred that the tool comprises a dedicated visual marker. This can be for example a so-called augmented reality code which is placed on the tool. When placing such augmented reality (AR) code on the tool it is in particular advantageous to have a plurality of such visual markers to ensure that independent of any possible orientation of the tool the position and orientation of the tool can be recognized safely.

Up to now it has been assumed that pre-stored 3D-shapes are available in the localization means and one of them is selected by for example an operator. But of course the localization means could also be trained by use of the tool similar to teaching a robot its positions. In order to do so the tool comprises preferably any means for triggering the localization means to record the tool's current position. This can be a button that is pushed by a guide for example in case that he has brought the tool into a particular position like for example the tip of a cone. After having recorded a plurality of positions representing significant points of the desired 3D-shape a localization means may determine a 3D-shape from this plurality of recorded positions of the tool. The localization means therefore connects the different recorded points and evaluates a surface that corresponds then to the trained or taught 3D-shape.

Furthermore it is highly advantageous if the operator, in particular in case that the tool is handled manually, has an impression of the 3D-shape relative to the object he is currently working on. In order to give the operator such an impression an overlay between the 3D-shape and the object is generated like it is known from the technical field of augmented reality. There may either be a display means comprised in the system which is configured to display such combination of the desired 3D-shape and a current image representing the status of operation wherein it is in particular preferred that such a combination is projected into a user's eye.

BRIEF DESCRIPTION OF THE DRAWINGS

The invention will now be described with respect to the annexed drawings. Particular features and aspects of the invention will be described to a preferred embodiment. In the figures there is shown in FIG. 1 an overview over the system according to the present invention.

DETAILED DESCRIPTION

Figure 1:
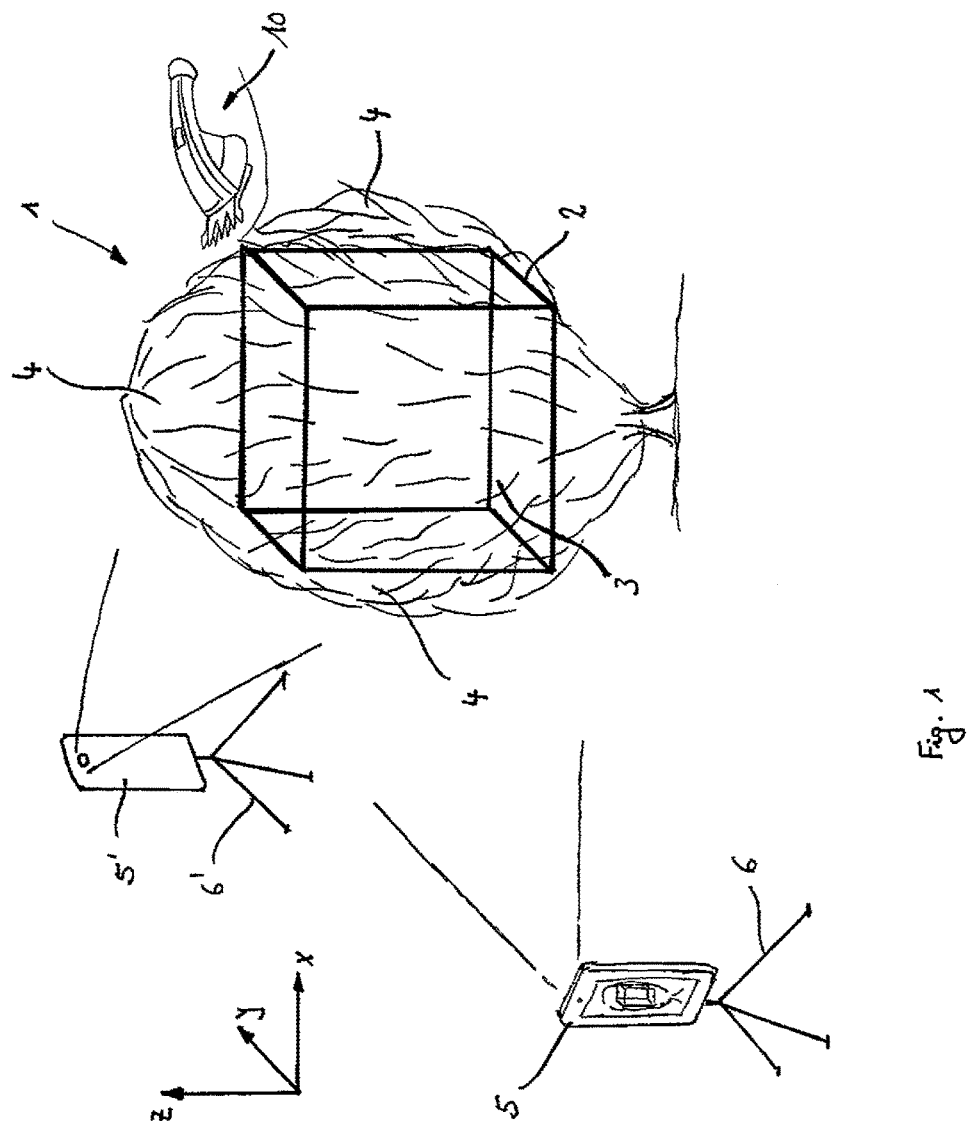

FIG. 1 shows a schematic of a system according to the invention. The system will be explained with reference to a situation in which the system is used and that is shown in FIG. 1. An object 1 is shown in its initial state which is the starting point for shaping it into a desired 3D-shape. In the present case the desired 3D-shape is indicated by cuboid 2. A cuboid 2 may be a 3D-shape which is stored in a localization means 5 as it will be explained in more detail later. The cuboid 2 which is an easy example of the 3D-shape defines an inside area 3 and an outside area 4. The inside area 3 is everything that lies within the surfaces of the cuboid 2.

It is to be noted that the cuboid 2 of course is only an example for an arbitrary 3D-shape.

The desired 3D-shape of the object 1 will be achieved by cutting everything that lies outside the cuboid 2 and which is indicated in the figure by areas 4. According to the invention the system comprises the localization means 5 including a camera unit capturing an image of the object 1 and a tool 10 which is used for cutting and thereby removing material from the object 1.

The localization means 5 furthermore comprises a processing means capable of performing image processing. By performing image processing the localization means 5 can calculate a position of the tool 10 and in particular the working head of the tool 10 relative to the surface of the 3D-shape, which is in the illustrated example the cuboid 2. Furthermore, in the localization means 5 it is determined on the basis of the relative position of the working head of tool 10 whether the cutting or grinding which is currently performed by the working head removes material from inside the cuboid 2. In that case a control means which is in the preferred embodiment included in the localization means 5 transmits a deactivation signal to the tool 10. As a consequence on the basis of the deactivation signal which is received by tool 10 the tool immediately stops the cutting function or grinding function of the working head of the tool 10.

Because it is important that the localization means 5 has a defined position relative to the 3D-shape which is the desired final shape of the object 1 the localization means 5 is arranged on a tripod 6. Since it is not possible to view every position to which the tool 10 has to be moved during generation of the desired 3D-shape it is preferred to have a second localization means 5' also positioned on a tripod 6' and having a position and orientation relative to the first localization means 5 which is known. On the basis of the known relative positions and orientations it is possible that the localization means 5 and the second localization means 5' use the same consistent coordinate system as indicated in the drawing.

It is also possible that the localization means 5 and the localization means 5' calibrate their positions autonomously for example by performing image processing and thus detecting and matching significant points in the captured images from each respective perspective. By identifying the significant points in the captured image of the other localization means 5', 5 it is then possible for the localization means 5, 5' to calculate their relative position in the coordinate system defined by the other localization means 5, 5'. In such a case, it is of course advantageous if one of the localization means 5, 5' is defined as a master which initially sets the coordinate system which is then to be used by the other localization means 5'. Furthermore, it is to be noted that in the illustrated example only a second localization means 5' is shown, but of course it is also possible to have even more than two localization means if necessary to capture images from all perspectives and with a sufficient view to each surface of the 3D-shape.

In an alternative or even in addition to the plurality of localization means 5, 5', it is also possible that one of the localization means 5, 5' is moved to a further position when shaping of the surfaces of the 3D-shape which is viewed from the initial position of the localization means 5, 5' is finished. Then in order to cover another prospective, the localization means 5, 5' is moved to a new position. The new position again is defined in the original coordinate system. This can be done by visual odometry or "structure from motion" algorithm (SfM) for example. In the latter case, a number of feature points are matched between image pairs and from the matching a movement of the camera in the original coordinate system can be determined.

Such structure from motion algorithm can also be used to suggest a position in which a desired 3D-shape that may be cut out of the initial object in the easiest way. In that case the feature points of the captured image are matched to the desired 3D-shape and as a result thereof, a position and orientation of the desired 3D-shape within the uncut plant is suggested. This may also include a suggestion for fitting of the size of the desired 3D-shape to the size of the initial object. Since the desired 3D-shape is defined by relative positions of the surface points adapting the size of the 3D-shape can be performed easily in the present invention contrary to a wire mesh skeleton as used according to the state of the art.

SfM may also be used to select a possible 3D-shape by making suggestions of 3D-shapes that are stored in the localization means 5, 5' which offer the best fit.

Since the cutting or grinding function of the tool 10 or to be more precise of the working head of the tool 10 is deactivated after reception of a deactivation signal, the tool 10 may be moved even randomly and nevertheless, the desired 3D-shape will be the result of moving tool 10. Of course, it is more efficient if only a correction is performed by the deactivation signal and this can be achieved by making indications to an operator who moves tool 10 which is the best direction of movement from the current position of tool 10. Since localization means 5 is aware of the current position of the tool 10, localization means 5 provides an assist signal which is sent to tool 10 and which includes information for the relative movement that tool 10 should perform in order to ensure efficient cutting. The movement is suggested starting from the current position and orientation of tool 10.

The explanation given above and the preferred embodiment use a handheld tool 10 for performing the cutting or grinding function. But of course the system may also be applied to an automated system which includes a handling structure like a robot for tool 10. In that case, one big advantage is that the handling tool may be rather imprecise, but nevertheless errors in positioning are compensated by deactivation of the cutting function of tool 10.

Figure 2:
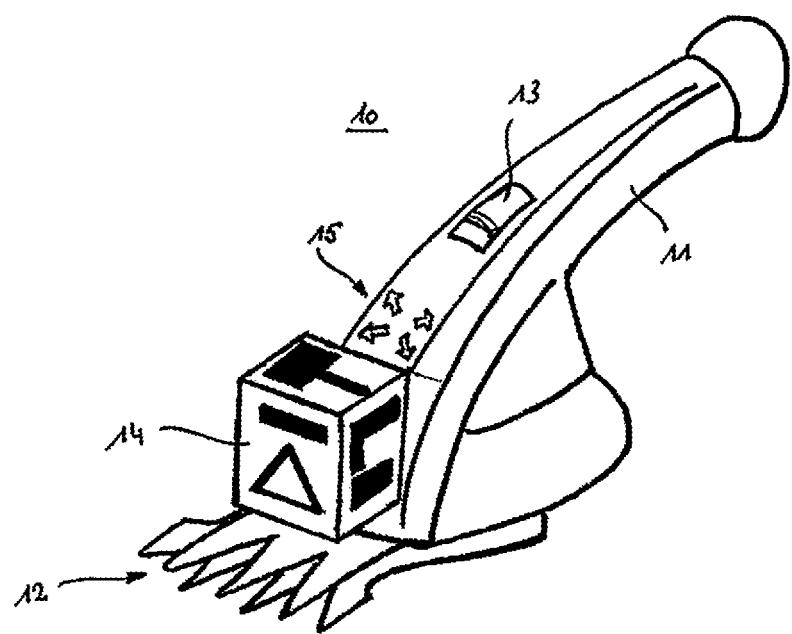
FIG. 2 an example for a tool comprising visual markers.

An example for a handheld tool as a tool 10, an electric cutter as it is often used for buxum tree cutting is illustrated in FIG. 2. In FIG. 2, tool 10 comprises a grip portion 11 that is used by an operator like a gardener in order to move tool 10. The cutting function is performed by a working head 12 which in the illustrated embodiment consists of only a single working head section. Alternatively, a plurality of such working head sections can be part of the tool 10. In the latter case it is in particular preferred that the working head sections may be driven by the tool 10 independently from each other such that for each of the working head sections the deactivation may be performed independently. The working head sections have relative positions to each other which are known because they are predetermined by the design of tool 10. Thus, it may be determined by localization means 5 which for example only detects the current position and orientation of the entire tool 10 where relative to the tool 10 the different working head sections are positioned currently. Then, it is possible to perform the deactivation of only single working head sections.

The tool 10 furthermore comprises an operation button 13 which at least has the function of switching on the cutting function. Switching on the cutting or grinding function usually is performed by the shown button 10 by moving it towards the working head 12. In addition, the button 13 may have a second function. A second function may be activated by pressing down the button 13 wherein it is preferred that when the button is pressed down, no movement towards the working head 12 can be performed simultaneously. Thus, in case that the button 13 is pressed down, no cutting can occur in error. By pressing down button 13 storing of the current position of the working head 12 in the localization means 5 is triggered. Thus, an individual 3D-shape may be calculated in the localization means if a plurality of such stored positions is available in a memory that is included in the localization means 5. In such a case, the operator indicates significant parts or significant points of the 3D-shape he intends to generate. In the case of the shown cuboid 2 of FIG. 1 these points may be the corners of the cuboid 2. On the basis of these significant points of the 3D-shape, the localization means 5 then calculates a 3D-shape and on the basis of this calculated shape the method as explained above can be performed. Thus, teaching of shapes is possible.

In principle it is possible to determine the position and orientation of tool 10 directly from the shape of tool 10. But it is preferred to have a visual marker 14 that is attached to tool 10 in order to enhance the detection of the position and orientation of tool 10. The visual marker 14 may be an augmented reality code as it is used for applications known from augmented reality and may be attached to any parts of tool 10. Only for illustration reasons a cuboid is attached to the front part of tool 10 where each of the surfaces of the cuboid are indicated with signs that may easily be distinguished. This ensures an easy recognition of the current position and orientation. Relative to such visual marker 14 the position of the working head 12 is known and thus, by determining the position of the visual marker 14 the actual position of the working head 12 can be calculated in the localization means 5.

As it has been explained already the tool 10 may be moved nearly randomly because the activation of the working head section will necessarily lead to the desired result of the 3D-shape of object 1. But of course it would be more efficient if the direction of movement of tool 10 at least nearly follows the surfaces of the desired 3D-shape 2 to assist an operator who moves tool 10 means for indicating 15 the optimal movement of tool 10 are provided. In the present case there are four signaling lights which have the shape of arrows and so if the respective arrow is lit than the operator knows to which direction the tool 10 should be moved approximately. It is self-explanatory that the direction by the four arrows is only an example for indicating a preferred movement of tool 10 and other solutions are also possible.

Another way of assisting the operator in handling and moving tool 10 is to provide a combined image in which not only the currently captured image of at least object 1 is displayed but like it is known from augmented reality the desired 3D-shape is also present in some kind of overlay. The resulting image may be displayed on a display of at least one of the localization means 5, 5' but it is in particular preferred that such a combined image is projected into a user's eye. Thus, during operation and during movement of the tool 10 the operator is always aware where the 3D-shape which he wants to produce has its surfaces and a much more precise handling of tool 10 is possible for the gardener.

A transmission of information between the localization means 5 and the tool 10 is preferred to be performed by wireless protocols such as Bluetooth or WiFi. This avoids that there is any cable that is needed to transfer the information which would be a danger because the gardener has to walk around the object 1 and thus could fall over such wire.

Furthermore it is also preferred that all the calculation and determination functions and so on which have been described with respect to the operation of the inventive system are provided by the application which is one on the processing means of the localization means 5. As it has already been explained above it is also preferred that one of the localization means 5,5', in case that there is a plurality of localization means used, functions as a master device and is communication with the hand-held tool 10. The other devices in that case only provide information about the relative position of the tool to the surface of the desired 3D-shape.

Figure 3:
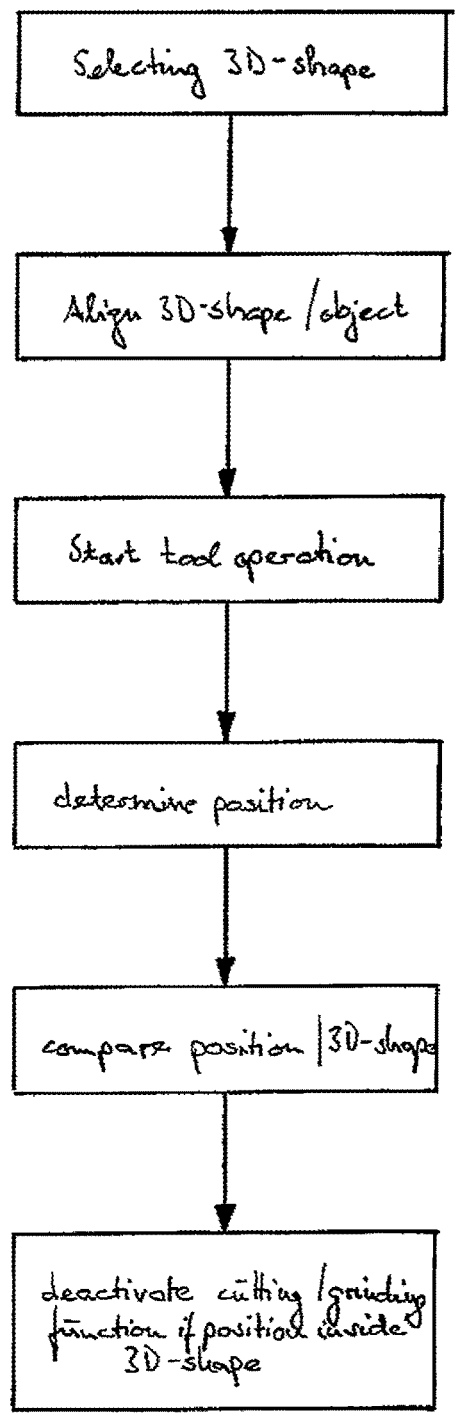
FIG. 3 a simplified flow chart for explaining the method for assisting reductive shaping of an object.

The simplified flow chart for the method according to the invention is shown in FIG. 3. At first a 3D-shape is selected. This selection may be assisted by the localization means 5 which at first takes a picture of unworked object 1 and determines the position and orientation of the desired 3D-shape or even suggests a shape which most probably fits the unworked object 1 best.

The 3D-shape and the object are then aligned which means that the localization means calculates the relative position from the fixed position of the localization means 5 such that the desired 3D-shape can be cut out of the unworked object 1. After that the tool operation of tool 10 is started. In the described embodiment this means that the operator moves the button 13 towards the working head and thus starts the cutting function of tool 10. During operation the position of tool 10 (and its orientation) is continuously determined and the position where the cutting function currently is performed is compared to the position of the 3D-shape. Each time the cutting and grinding function would remove material from an inside of the 3D-shape the cutting/grinding function is deactivated. As it has been explained above such cutting/grinding function may be controlled for a plurality of working head sections individually.

After the deactivation of the cutting function (or grinding function) occurred the tool 10 is moved to the outside of the 3D-function either by an automated handling system or because the gardener recognizes that the cutting stopped. There are in general two different possibilities to restart the cutting function. The first is that the operator needs to move back and forth button 13 each time the cutting function was deactivated. This has the advantage that no unintended movement of the knives of a working head can occur. Alternatively the cutting function may be restarted automatically when the working head is moved to the outside of the 3D-shape again. In particular if a plurality of working head sections is part of tool 10 this makes it easier for the operator because he does not need to first stop all the working head sections and then to restart again.

All the explanations that have been given above were about the cutting of 3D-shapes by a hand-held tool manually operated by a gardener. As it was indicated also a semi-automated system could be used or grinding instead of cutting and the like. The invention may be used with respect to any removal of material from an initial object in order to generate an object having a desired 3D-shape.

The invention claimed is:

1. System for assisting reductive shaping of plants to form a desired 3D-shape by removing material, comprising:
    a tool configured to remove material from at least one plant by means of a cutting function performed by a working head of the tool,
    localization means configured to determine a position of the working head relative to the desired 3D-shape, and
    control means configured to deactivate the cutting function when the determined position of the working head relative to the desired 3D-shape is such that the cutting function would remove material from an inside of the desired 3D-shape.

2. System according to claim 1, wherein
    the tool is a handheld tool.

3. System according to claim 1, wherein
    the working head consists of a plurality of working head sections, which can be activated and deactivated separately.

4. System according to claim 1, wherein
    the tool comprises means for indication a direction of most efficient movement.

5. System according to claim 1, wherein
    the localization means comprises a camera unit and a processing unit configured to perform image processing of images captured by the camera unit.

6. System according to claim 1, wherein
the tool and the control means are prepared to communicate wirelessly.

7. System according to claim 1, wherein
the localization means is configured to obtain 3D information of at least the plant before or during operation.

8. System according to claim 7, wherein
the localization means is configured to assist selection or positioning of the desired 3D-shape.

9. System according to claim 1, wherein
the localization means comprises at least two localization units.

10. System according to claim 9, wherein
the localization units are configured to calibrate their coordinate systems.

11. System according to claim 1, wherein
the localization means is configured to determine its position in a consistent coordinate system after being moved from one position to another.

12. System according to claim 1, wherein
the tool comprises a dedicated visual marker.

13. System according to claim 1, wherein
the tool comprises means for triggering the localization means to record the tool's current position.

14. System according to claim 13, wherein
the localization means is configured to determine a 3D-shape from a plurality of recorded positions of the tool.

15. System according to claim 1, wherein
the system comprises a display means configured to display or generate a projection into a user's eye of a combination of the desired 3D-shape and an image representing a current status of operation.

16. Method for assisting reductive shaping of plants to form a desired 3D-shape by removing material from at least one plant, the method comprising the steps:
determining, by a localization means, a position of a tool's working head relative to the desired 3D-shape, and
deactivating, by a control means, a cutting function of the working head when the determined position of the working head relative to the desired 3D-shape is such that the cutting function would remove material from an inside of the desired 3D-shape.

17. Method according to claim 16, wherein
a direction of most efficient movement of the tool is indicated by the tool.

18. Method according to claim 16, wherein
the localization means determines its position in a consistent coordinate system after being moved from one position to another.

19. Method according to claim 16, wherein
a current position of the working head of the tool is recorded when a respective trigger signal is received by the localization means.

20. Method according to claim 19, wherein
a 3D-shape is calculated from a plurality of recorded positions.

* * * * *